(12) United States Patent
Choi

(10) Patent No.: US 6,201,832 B1
(45) Date of Patent: Mar. 13, 2001

(54) SYNCHRONOUS/ASYNCHRONOUS DATA DETECTION APPARATUS FOR USE IN A MAGNETIC RECORDING/PLAYBACK SYSTEM

(75) Inventor: Byung-Bong Choi, Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/103,476

(22) Filed: Jun. 24, 1998

(30) Foreign Application Priority Data

Jun. 25, 1997 (KR) .................................. 97-27170

(51) Int. Cl.$^7$ .............................. H03H 7/30; H04B 1/10
(52) U.S. Cl. ...................... 375/233; 375/232; 375/341; 375/346; 360/51; 360/65
(58) Field of Search .................... 360/51, 46, 65; 375/232, 233, 290, 341, 346, 348, 350

(56) References Cited

U.S. PATENT DOCUMENTS

| | | | |
|---|---|---|---|
| 5,521,945 | * 5/1996 | Knudson | 375/341 |
| 5,581,585 | * 12/1996 | Takatori et al. | 375/376 |
| 5,710,792 | * 1/1998 | Fukawa et al. | 375/229 |
| 5,757,855 | * 5/1998 | Strolle et al. | 375/262 |
| 5,862,005 | * 1/1999 | Leis et al. | 360/27 |
| 5,886,748 | * 3/1999 | Lee | 348/614 |
| 6,023,386 | * 2/2000 | Reed et al. | 360/51 |
| 6,028,902 | * 2/2000 | Kiyanagi et al. | 375/355 |

FOREIGN PATENT DOCUMENTS

| | | |
|---|---|---|
| 0777211 | 6/1997 | (EP) . |
| 0887796 | * 6/1998 | (EP) . |
| 9720383 | 6/1997 | (WO) . |

OTHER PUBLICATIONS

H. Sawaguchi and W. Sakurai: "Performance Evaluation and Error Propagation Analysis of Decision–Feedback Equalization with Maximum–Likelihood Detector", IEICE Transactions on Electronics, vol. E78–C, No. 11, Nov. 1995, pp. 1575–1581, XP000552670 Tokyo * p. 1575, col., 1, line 1—p. 1575, col. 2, line 26; figure 1 *.

* cited by examiner

Primary Examiner—Young T. Tse
(74) Attorney, Agent, or Firm—Anderson Kill & Olick, PC

(57) ABSTRACT

In a data detection apparatus for use in a magnetic recording/playback system, an A/D converter converts an analog playback signal into digital playback data at a sampling rate in accordance with a previously obtained (i–1)st sampling clock signal ($SCS_{i-1}$) to provide an ith sample value ($S_i$). An interpolation filter performs interpolation filtering on the $S_i$ based on a previously obtained (i–1)st phase error (PE) signal ($PE_{i-1}$) to provide an ith interpolated sample value ($IS_i$) and an ith hold signal ($H_i$) under a predetermined hold condition in an asynchronous mode (ASM). An equalization channel (EC) equalizes the $IS_i$ by using a partial response 4 method either based on a previously obtained (i–1)st error signal ($E_{i-1}$) in a synchronous mode or based on the $E_{i-1}$ and a previously obtained (i–1)st hold signal ($H_{i-1}$) in ASM to supply an ith equalized sample value ($ES_i$). A maximum likelihood sequence detection (MLSD) circuit performs MLSD on the $ES_i$ to supply a binary value representing a final survivor path (SP) and (i–2)nd to ith decision values ($D_{i-2}$, $D_{i-1}$ and $D_i$) representing SP's. A subtractor produces an ith error signal (Ei) by subtracting the $D_{i-1}$ from the $ES_i$. A PE detection (PED) circuit performs PED based on the $D_i$, $D_{i-2}$ and $E_{i-1}$ to provide an ith PE signal ($PE_i$). And a sampling clock signal (SCS) generator generates an ith SCS ($SCS_i$) by using the $PE_i$.

15 Claims, 12 Drawing Sheets

SYNCHRONOUS/ASYNCHRONOUS DATA DETECTION APPARATUS FOR USE IN A MAGNETIC RECORDING/PLAYBACK SYSTEM

FIELD OF THE INVENTION

The present invention relates to a data detection apparatus for use in a magnetic recording/playback system; and, more particularly, to a synchronous/asynchronous data detection apparatus for use in a magnetic recording/playback system.

DESCRIPTION OF THE PRIOR ART

An analog-based recording/playback technique has long been used in a conventional magnetic recording/reproducing system such as a video cassette recorder (VCR). When images are recorded in an analog form, which is then played back by using a conventional magnetic recording/reproducing system, the image quality may be markedly deteriorated.

For example, when a conventional VCR utilizing an analog-based recording/playback technique is in a playback mode, signals distorted due to noises and jitters are directly delivered from the VCR. Moreover, if the signals are edited or other operation is performed on the signals, distortions tend to accumulate, thereby resulting in further deterioration of the played back image quality. Therefore, development of a VCR utilizing a digital-based recording/playback technique capable of overcoming the above-mentioned shortcomings of the analog VCR has been proposed.

It is well known in the art that in the recording mode of a digital VCR, an analog video and an analog audio signals which have been coded and modulated are sampled and converted into discrete quantized digital values, and then these digital values are recorded on a magnetic tape which is used by the digital VCR as a typical data storage medium.

In the playback mode of a conventional digital VCR, magnetic flux transitions are induced in a read element of a magnetic head and supplied over a path to a preamplifier as an analog signal. The preamplifier amplifies the analog signal to a predetermined level to thereby provide an analog playback signal.

And then, an analog to digital (A/D) converter of the digital VCR converts the analog playback signal at a predetermined channel rate into a digital playback signal. The digital playback signal is transmitted to a digital data processing channel of the digital VCR, wherein the digital playback signal is detected and processed.

But, in the process of digital data detection and transmission thereof, there may occur a channel-induced signal distortion, such as inter-symbol interference (ISI) due to a high speed data transmission over channels of limited bandwidth, which causes obstruction in data transmission thereof, thereby entailing transmission errors. It is well known in the art that partial response maximum likelihood (PRML) method is effective to correct ISI incurred therein.

Therefore, a conventional digital VCR usually comprises a data detection apparatus including an equalization circuit having filters to equalize a digital playback signal to an equalized signal, e.g., a partial response class 4 (PR4) signal. For example, a discrete time finite impulse response (FIR) filter receives and equalizes sample values of a digital playback signal to a predetermined spectrum by using a so called PRML method, wherein the discrete time transfer function for use in the PRML technique is typically $(1-D^2)$, wherein D represents a unit-time delay operator.

In a PRML method, the output from a noisy partial response channel is sampled at a predetermined channel rate and detected by using a PRML detector. Typically, a viterbi detector is used in a maximum likelihood sequence detection (MLSD) of the sampled partial response channel. It is well known in the art that a viterbi algorithm is an iterative process of keeping track of the path with the smallest accumulated metric leading to each state in the trellis.

In detail, the metrics of all of the paths leading to a particular state are calculated and compared in the viterbi algorithm. Then, the path with the smallest metric is selected as a survivor path. In this manner, all paths which can be part of the minimum metric paths through the trellis are stored in a path memory.

Given that the path memory is sufficiently long, all of the survivor paths will diverge from a single path within the span of the path memory. The single path from which all the current survivor paths diverge is a minimum metric path. An input sequence associated with the minimum metric path appears in all the outputs of the Viterbi detector.

The structure and function of a conventional data detection apparatus for use in a magnetic recording/playback system can be explained with reference to FIG. 1. FIG. 1 provides a block diagram of a same data detection apparatus 8 for use in a magnetic recording/playback system as that described in U.S. Pat. No. 5,521,945. This patent discloses a data detection apparatus including an equalization circuit having filters to equalize a digital playback signal to a PR4 signal by employing PR4 technique (see, FIG. 5; and column 8, line 32 to column 9, line 47 of U.S. Pat. No. 5,521,945). The data detection apparatus 8 comprises an analog to digital (A/D) converter 2, a discrete-time FIR filter 3, a viterbi detector 4 and a timing control circuit 5.

In the data detection apparatus 8, an analog playback signal is first inputted to the A/D converter 2. The A/D converter 2 samples and converts the analog playback signal at a channel rate of 1/T into digital playback data to thereby provide discrete-time sample values of the digital playback data, wherein T is a duration of a channel symbol. And then, the FIR filter 3 equalizes the sample values to thereby supply PR4 signals as estimated sample values to the viterbi detector 4 and the timing control circuit 5.

The timing control circuit 5 sets a rate and phase of the sampling within the A/D converter 2 in order to synchronize a sampling clock by minimizing errors between the sample values and the estimated values based on the estimated values. The viterbi detector 4 finds the output data sequence, i.e., the estimated values closest to the received data sequence by using a known iterative algorithm. The output data sequence is fed to a post-processor for further processing thereof.

A conventional data detection apparatus such as the one described above, however, has certain limitations. First, the conventional data detection apparatus operates only in a synchronous mode, wherein the sampling rate of the A/D converter is controlled by a timing control circuit. But in some cases, it is preferable to operate the data detection apparatus in an asynchronous mode since in the asynchronous mode, a predetermined constant sampling clock signal is supplied to the A/D converter, thereby rendering the structure and control thereof simple. In short, the conventional data detection apparatus cannot realize an asynchronous mode operation thereof.

And the conventional data detection apparatus cannot utilize the output data sequence from the viterbi detector to equalize sample values in an equalization circuit such as the FIR filter 3 and to perform timing control, e.g., in the timing control circuit 5. Therefore, the conventional data detection apparatus also has limitation in enhancing the performance of the equalization circuit and the timing control circuit.

As a result, the conventional data detection apparatus has limitations of both decreasing the transmission error rate and enhancing the data detection efficiency thereof.

SUMMARY OF THE INVENTION

It is, therefore, an object of the present invention to provide a synchronous/asynchronous data detection apparatus for use in a magnetic recording/playback system.

Another object of the present invention is to provide a synchronous/asynchronous data detection apparatus for use in a magnetic recording/playback system, wherein the apparatus uses output data from a maximum likelihood sequence detection (MLSD) channel thereof in equalization process and timing control process thereof.

In accordance with the present invention, there is provided a synchronous/asynchronous data detection apparatus for use in a magnetic recording/playback system including a magnetic head having a read element to detect N number of binary data values, N being a predetermined positive integer, from analog playback signals obtained through preamplifying magnetic flux transitions induced by the read element of the magnetic head from a magnetic recording medium to a predetermined level, wherein the system is operated in either a synchronous mode or an asynchronous mode, the apparatus comprising: a memory control unit (MCU) for generating system control signals including a set of first signals having a set of feedforward equalization (FFE) initial filter coefficients (<FFE__IFC>), a set of decision feedback equalization (DFE) initial filter coefficients (<DFE__IFC>), a FFE initial load (FFE__IL), a DFE initial load (DFE__IL), a FFE convergence constant (FFE__$\mu$) and a DFE convergence constant (DFE__$\mu$) and a set of second signals having a ratio signal (W) of a data detection frequency over a predetermined recording frequency, a predetermined clear signal (CLR) and a predetermined slice level (SL), wherein the W is equal to 1 in the synchronous mode and the W is not equal to 1 in the asynchronous mode; an analog to digital (A/D) converter to convert an ith analog playback signal into digital playback data at a sampling rate predetermined in accordance with a previously obtained (i–1)st sampling clock signal ($SCS_{i-1}$) to thereby provide an ith sample value ($S_i$), wherein i is a positive integer representing a data detection order; an interpolation filter for performing interpolation filtering on the $S_i$ based on the W and a previously obtained (i–1)st phase error signal ($PE_{i-1}$) in the synchronous/asynchronous mode to thereby provide an ith interpolated sample value ($IS_i$) and further provide an ith. hold signal ($H_i$) when a predetermined hold condition is satisfied in the asynchronous mode, wherein i ranges from 1 to N; an adaptive equalizer for performing adaptive equalization on the $IS_i$ to thereby supply an ith equalized sample value ($ES_i$), wherein said adaptive equalization is performed based on the first signal set, a previously obtained (i–1)st decision value ($D_{i-1}$) and a previously obtained (i–1)st error signal ($E_{i-1}$) in the synchronous mode and performed based on the first signal set, the $E_{i-1}$, the $D_{i-1}$ and a previously obtained (i–1)st hold signal ($H_{i-1}$) in the asynchronous mode; a maximum likelihood sequence detection (MLSD) channel to detect survivor paths, thereby supplying an ith binary data value ($BD_i$) representing a final survivor path obtained therein and an ith decision value ($D_i$), the $D_{i-1}$ and an (i–2)nd decision value ($D_{i-2}$) representing survivor paths detected therein, wherein the MLSD is performed based on the SL and CLR in the synchronous mode and performed based on the SL, CLR and $H_{i-1}$ in the asynchronous mode; a subtractor for subtracting the $D_{i-1}$ from the $ES_i$ to thereby produce an ith error signal ($E_i$); a phase error signal provider for obtaining a phase error signal based on the $D_i$, $D_{i-2}$ and $E_{i-1}$ to thereby supply the phase error signal as an ith phase error signal ($PE_i$); and a sampling clock generator for generating an ith sampling clock signal ($SCS_i$) based on the W and the $PE_i$.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
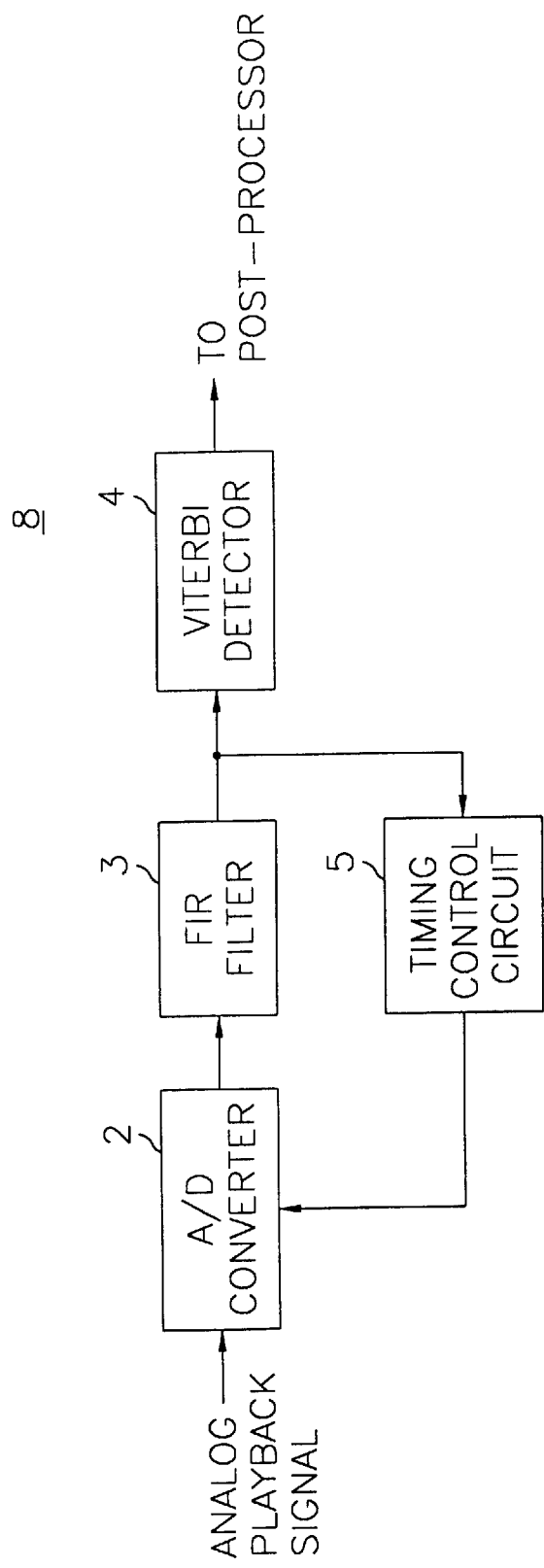
FIG. 1 provides a block diagram of a conventional data detection apparatus for use in a magnetic recording/playback system.
Figure 2:
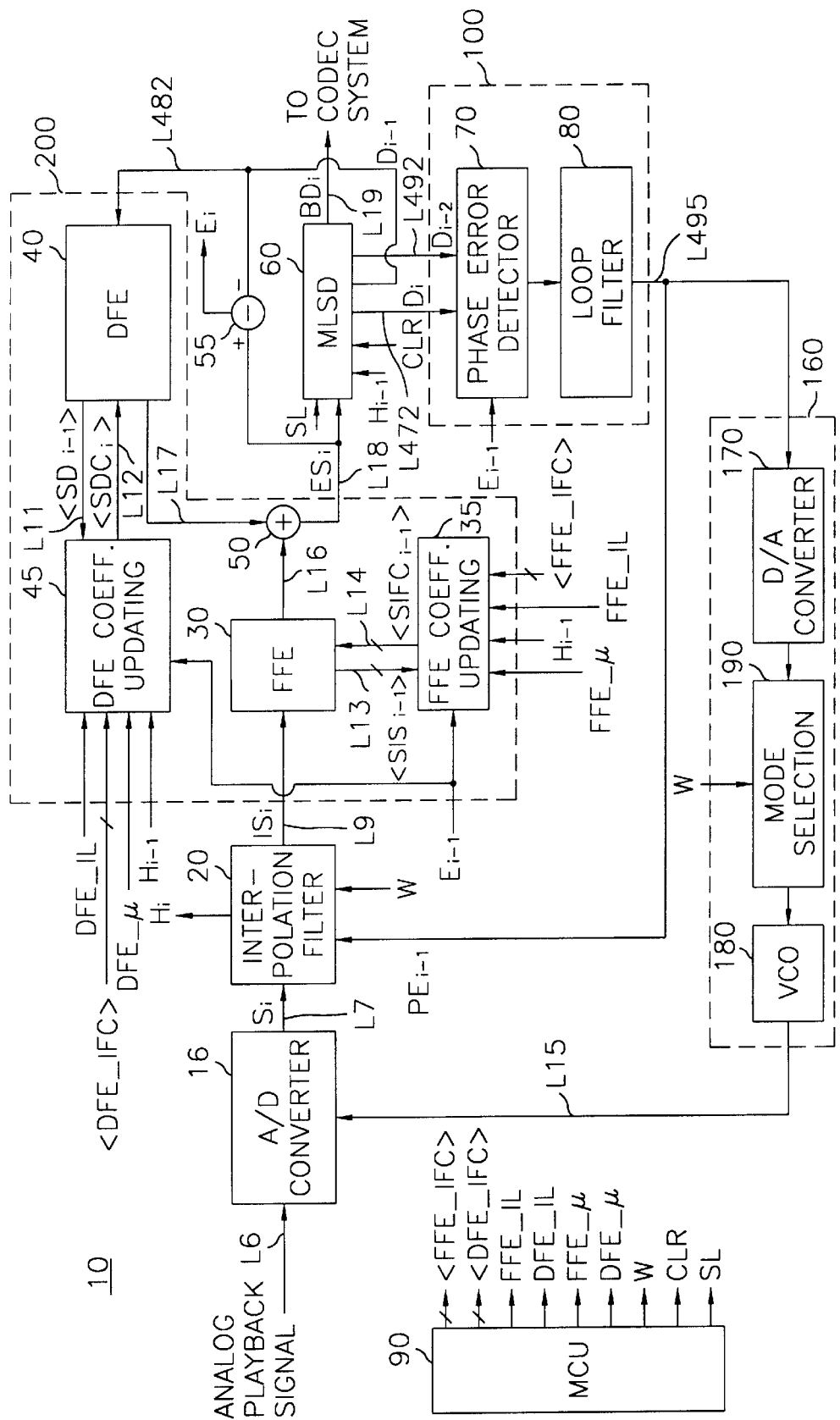
FIG. 2 illustrates a block diagram of a data detection apparatus for use in a magnetic recording/playback system in accordance with a preferred embodiment of the present invention.

Referring now to FIG. 2, there is illustrated a block diagram of a data detection apparatus 10 for use in a magnetic recording/playback system in accordance with a preferred embodiment of the present invention.

The magnetic recording/playback system is provided with a magnetic head (not shown) having a read element (not shown). The data detection apparatus 10 detects N number of binary data values, N being a predetermined positive integer, from analog playback signals obtained through preamplifying magnetic flux transitions induced by the read element of the magnetic head from a magnetic recording medium, e.g., a magnetic tape to a predetermined level. The system is operated in either a synchronous mode or an asynchronous mode.

The apparatus 10 comprises a memory control unit (MCU) 90, an analog to digital (A/D) converter 16, an interpolation filter 20, an adaptive equalization channel 200, a maximum likelihood sequence detection (MLSD) channel 60, a subtractor 55, a phase error signal providing circuit 100 and a sampling clock signal (SCS) generating circuit 160.

The adaptive equalization channel 200 includes a feed-forward equalization (FFE) circuit 30, a decision feedback equalization (DFE) circuit 40, a FFE coefficients updating circuit 35, a DFE coefficients updating circuit 45 and an adder 50. The phase error signal providing circuit 100 includes a phase error detector 70 and a loop filter 80. The SCS generating circuit 160 includes a digital to analog (D/A) converter 170, a mode selection circuit 190 and a voltage controlled oscillation (VCO) circuit 180.

The MCU 90 generates system control signals for use in initializing or resetting the operation of the apparatus 10. The system control signals include a set of first signals having a set of feedforward equalization (FFE) initial filter coefficients (<FFE_IFC>), a set of decision feedback equalization (DFE) initial filter coefficients (<DFE_IFC>), a FFE initial load (FFE_IL), a DFE initial load (DFE_IL), a FFE convergence constant (FFE_$\mu$) and a DFE convergence constant (DFE_$\mu$).

And the system control signals also include a set of second signals having a ratio signal (W) of a data detection frequency over a predetermined recording frequency, a predetermined clear signal (CLR) and a predetermined slice level (SL), wherein the W is equal to 1 in the synchronous mode and the W is not equal to 1 in the asynchronous mode. From now on, for simplicity, the operation of the apparatus 10 is described for its ith data detection process, wherein i ranges from 1 to N.

The A/D converter 16 converts an ith analog playback signal inputted thereto through a line L6 into digital playback data at a sampling rate predetermined in accordance with a previously obtained (i-1)st sampling clock signal ($SCS_{i-1}$) fed thereto via a line L15 from the SCS generating circuit 160 to thereby provide an ith sample value ($S_i$) to the interpolation filter 20 via a line L7.

It should be noted here that i is a positive integer representing a data detection order. And from now on, it is assumed that one detection delay (DD) points out either a delay between a current data detection and its subsequent data detection or a delay between a previous data detection and a current data detection.

The interpolation filter 20 performs interpolation filtering on $S_i$ based on the W inputted thereto from MCU 90 and a previously obtained (i-1)st phase error signal ($PE_{i-1}$) fed thereto from the phase error signal providing circuit 100 through a line L495 in the synchronous/asynchronous mode to thereby provide an ith interpolated sample value ($IS_i$) to the adaptive equalization channel 200 via a line L9 and further provide an ith hold signal ($H_i$) to the adaptive equalization channel 200 and the MLSD channel when a predetermined hold condition is satisfied in the asynchronous mode.

Figure 12:
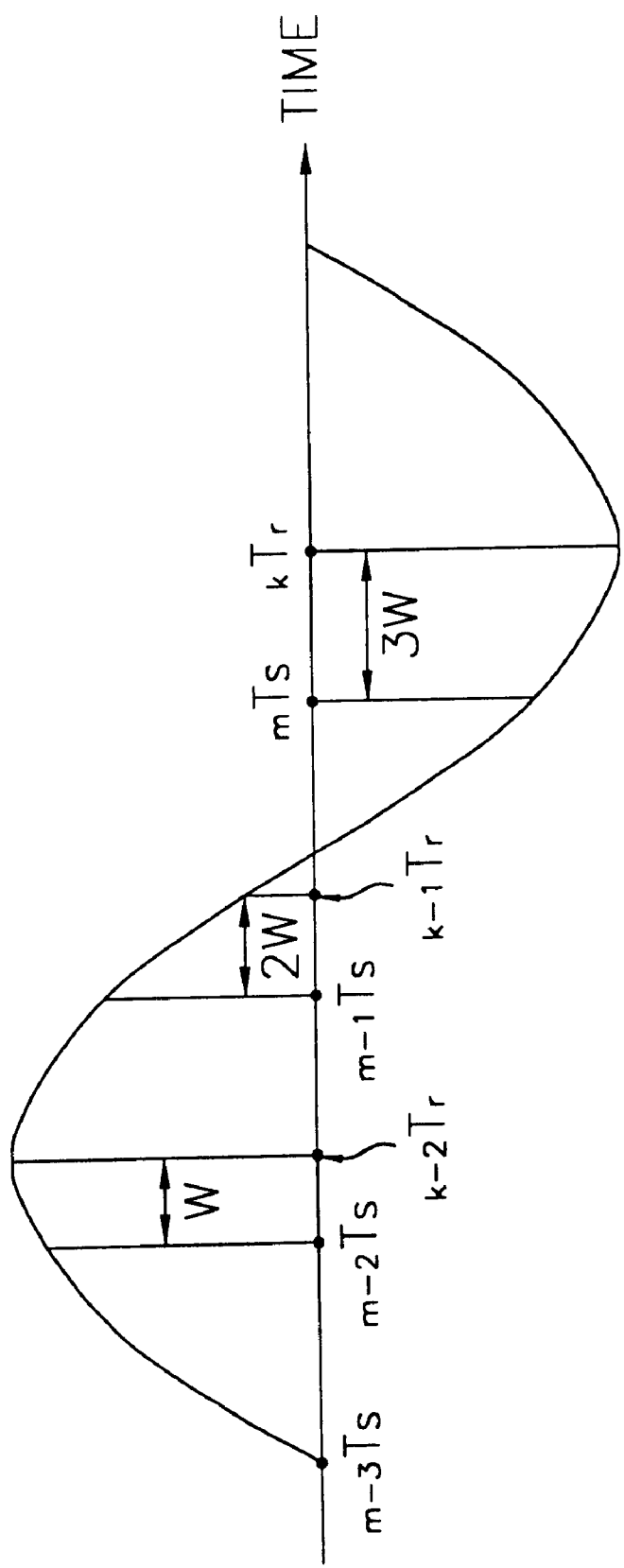
FIG. 12 depicts a wave form diagram to explain the generation of a ratio signal W of a sampling frequency over a predetermined recording frequency in relation to asynchronous mode operation of the data detection apparatus illustrated in FIG. 2.

Referring to FIG. 12, there is depicted a waveform diagram to explain the generation of a ratio signal W of a sampling frequency over a predetermined recording frequency in relation to asynchronous mode operation of the data detection apparatus 10 illustrated in FIG. 2. In FIG. 12, mTs represents an m-th sampling time of a sample value and kTr represents a k-th recording time of a corresponding recorded value on the magnetic recording medium. FIG. 12 depicts an increase in the interval between a sampling time of a sample value and a corresponding recording time of a corresponding recorded sample value as time goes on.

The interpolation filter 20 performs interpolation filtering on $S_i$ to prevent the interval from exceeding a predetermined level, e.g., one symbol time interval or one data detection interval by providing the $H_i$ to the adaptive equalization channel and the MLSD channel when a preset or predetermined hold condition is satisfied in the asynchronous mode.

Figure 3:
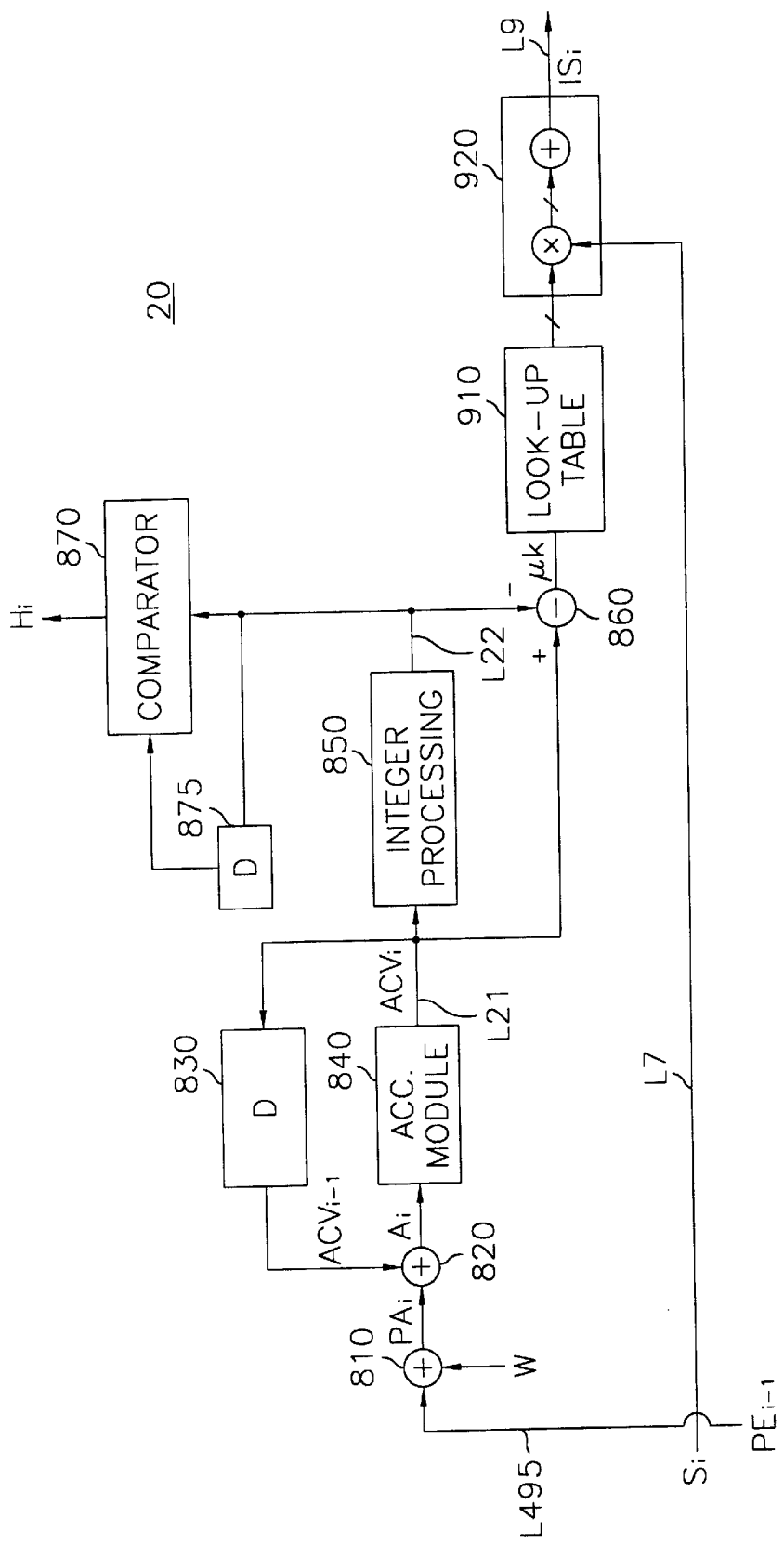
FIG. 3 depicts a detailed block diagram of an interpolation filter within the data detection apparatus illustrated in FIG. 2.

Referring to FIG. 3, there is depicted a detailed block diagram of the interpolation filter 20 in the data detection apparatus 10 illustrated in FIG. 2. The interpolation filter 20 includes a first adder 810, a second adder 820, an accumulation module 840, a first delay circuit 830, an integer processing circuit 850, a first comparator 870, a second delay circuit 875, a first subtractor 860, a look-up table processor 910 and a finite response filter 920.

The first adder 810 adds $PE_{i-1}$ inputted thereto from the phase error signal providing circuit 100 through the line L495 to the W fed thereto from the MCU 90, thereby providing an ith pre-added signal ($PA_i$) to the second adder 820. The second adder 820 adds the $PA_i$ to a previously obtained (i-1)st accumulation module value ($ACV_{i-1}$) inputted thereto from the first delay circuit 830, thereby providing an ith added signal ($A_i$) to the accumulation module 840.

The accumulation module 840 accumulates the $A_i$ to thereby supply an ith accumulated value ($ACV_i$) to the first delay 830, the integer processing circuit 850 and the first subtractor 860 through a line L21 if the $ACV_i$ is equal to or less than a predetermined threshold integer value (TH). And the accumulation module 840 substitutes the ACVi with an ith corrected accumulated module value ($CACV_i$) obtained by subtracting the TH from the $ACV_i$ if the $ACV_i$ is greater than the TH, thereby supplying the $CACV_i$ as an $ACV_i$ to the first delay 830, the integer processing circuit 850 and the first subtractor 860 through the line L21.

The first delay circuit 830 delays the $ACV_i$ by the DD to thereby provide a delayed $ACV_i$ to the second adder 820 to be added thereat to a subsequent pre-added signal ($PA_{i+1}$) as a previously obtained ith accumulated value. The integer processing circuit 850 gets only the integer value from $ACV_i$ to thereby supply an ith integer to the second delay circuit 875, the first subtractor 860 and the first comparator 870 via a line L22.

The first comparator 870 compares the ith integer with a previously obtained (i-1)st integer inputted thereto from the second delay 875 and generates and then supplies the $H_i$ to the adaptive equalization channel 200 and the MLSD channel 60 if the predetermined hold condition is satisfied.

In accordance with a preferred embodiment of the present invention, the predetermined hold condition is that the absolute difference between the ith integer and the previously obtained (i-1)st integer is greater than 1. The second delay circuit 875 delays the ith integer by the DD to thereby provide a delayed ith integer to the first comparator 870 as a previously obtained ith integer to be compared with an (i+1)st integer thereat.

The first subtractor 860 subtracts the ith integer from the $ACV_i$ to thereby generate a $\mu k$ representing the difference between the ith integer and the $ACV_i$. The $\mu k$ is transmitted to the look up table processor 910. The look up table processor 910 selects a corresponding set of filter coefficients among sets of predetermined filter coefficients by using the $\mu k$ as an address signal to access the sets, thereby providing the corresponding set of filter coefficients to the finite response filter 920.

The finite response filter 920 performs filtering on the corresponding set of filter coefficients based on the $S_i$ inputted thereto from the interpolation filter 20 through the line L7 by using a known finite response filtering method to thereby provide the $IS_i$ to the adaptive equalization channel 200 via the line L9.

The adaptive equalization channel 200 performs adaptive equalization on the $IS_i$ to thereby supply an ith equalized sample value ($ES_i$) to the subtractor 55 and the MLSD channel 60 through a line L18. In this case, the adaptive equalization performed by the adaptive equalization channel 200 is performed based on the first signal set, a previously obtained (i-1)st decision value ($D_{i-1}$) and a previously obtained (i-1)st error signal ($E_{i-1}$) in the synchronous mode; and performed based on the first signal set, $E_{i-1}$, $D_{i-1}$ and a predetermined (i-1)st hold signal ($H_{i-1}$) in the asynchronous mode.

The FFE coefficients updating circuit 35 performs FFE coefficient updating based on the FFE_IL, <FFE_IFC>, FFE_$\mu$, $E_{i-1}$ and a previously obtained (i-1)st set (<$SIS_{i-1}$>) of interpolated sample values inputted thereto via a line L13 from the FFE circuit 30 to thereby supply an ith set (<$SFC_i$>) of FFE coefficients having k number of FFE coefficients ($B_1$ to $B_k$) to the FFE circuit 30 via a line L14. It should be noted here that k is a predetermined positive integer and the <$SIS_{i-1}$> has k number of interpolated sample values ($L_1$ to $L_k$). And in the asynchronous mode, the FFE coefficients updating circuit 35 performs FFE coefficient updating based on <$SIS_{i-1}$>, FFE_IL, <FFE_IFC>, FFE_$\mu$, $E_{i-1}$ and $H_{i-1}$ to thereby supply an <$SIFC_i$> to the FFE circuit 30 via the line L14.

The DFE coefficients updating circuit 45 performs DFE coefficient updating based on the DFE_IL, <DFE_IFC>, DFE_$\mu$, $E_{i-1}$ and a previously obtained (i-1)st set (<$SD_{i-1}$>) of decision values inputted thereto via a line L11 from the DFE circuit 40 to thereby supply an ith set (<$SDC_i$>) having k number of DFE coefficients ($J_1$ to $J_k$) to the DFE circuit 40 via a line L12. It should be noted here that the <$SD_{i-1}$> has k number of decision values ($Q_1$ to $Q_k$). And in the asynchronous mode, the DFE coefficients updating circuit 45 performs DFE coefficient updating based on <$SD_{i-1}$>, DFE_IL, <DFE_IFC>, DFE_$\mu$, $E_{i-1}$ and $H_i$ to thereby supply an <$SDC_i$> to the DFE circuit 40 via the line L12.

Figure 4:
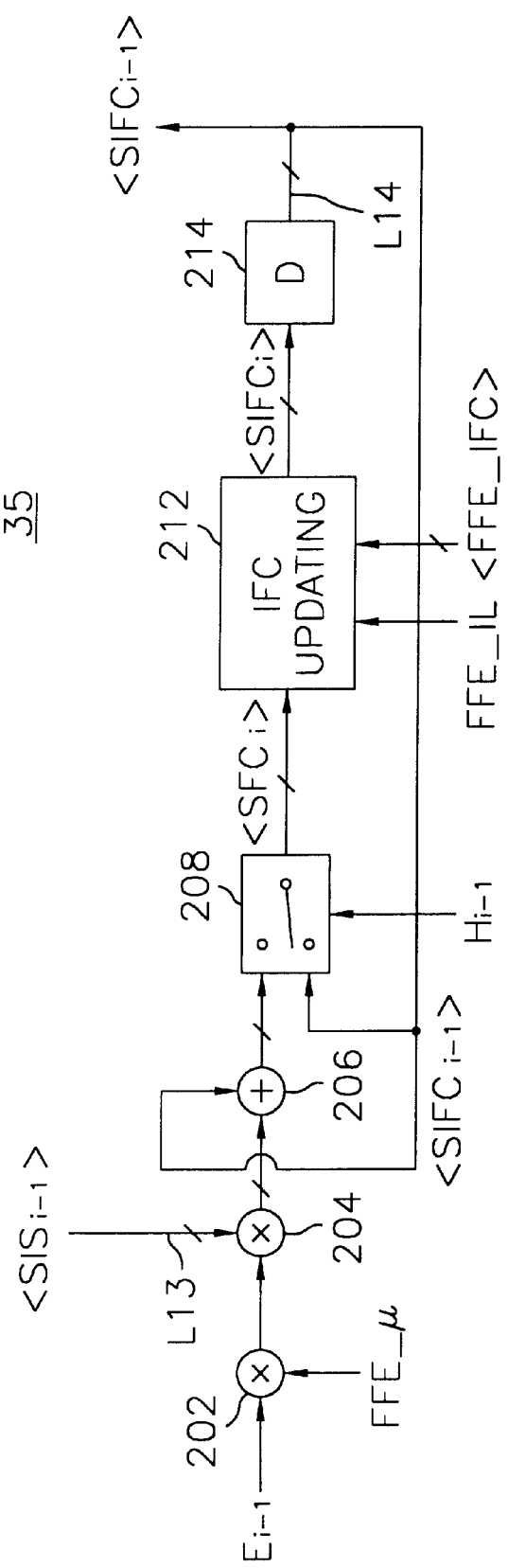
FIG. 4 exhibits a detailed block diagram of a feedforward equalization (FFE) coefficients updating circuit within the data detection apparatus illustrated in FIG. 2.

In detail, referring to FIG. 4, there is exhibited a detailed block diagram of the FFE coefficients updating circuit 35 within the data detection apparatus 10 illustrated in FIG. 2. The structure and function of the DFE coefficients updating circuit 45 is the same as that of the FFE coefficients updating circuit 35. Hence, for simplicity, only the structure and function of the FFE coefficients updating circuit 35 is described hereinafter.

The FFE coefficients updating circuit 35 contains a third multiplying circuit 202, a 4th multiplier 204, a 5th adder 206, a switch 208, an initial filter coefficients (IFC) updating circuit 212 and a third delay circuit 214. The third multiplying circuit 202 multiplies the $E_{i-1}$ by the FFE_$\mu$ to thereby provide a third multiplied value to the 4th multiplier 204. The 4th multiplier 204 multiplies the third multiplied value with the <$SIS_{i-1}$> to thereby provide a 4th multiplied values set to the 5th adder 206.

The 5th adder 206 adds the 4th multiplied values set to a previously obtained (i-1)st initial filter coefficients set (<$SIFC_{i-1}$>) inputted thereto from the third delay circuit 214, thereby supplying a candidate FFE coefficients set to the switch 208. The switch 208 provides the candidate FFE coefficients set as the ith set (<$SFC_i$>) of IFC to the IFC updating circuit 212 if the $H_{i-1}$ is not inputted thereto from the interpolation filter 20 and provides the <$SIFC_{i-1}$> as the <$SFC_i$> to the IFC updating circuit 212 if the $H_{i-1}$ is inputted thereto from the interpolation circuit 20.

The IFC updating circuit 212, based on the FFE_IL, <FFE_IFC> and <$SFC_i$>, performs IFC updating to thereby supply an ith initial filter coefficients set (<$SIFC_i$>) to the delay circuit 214. The third delay circuit 214 delays the <$SIFC_i$> by the DD to thereby provide a delayed <$SIFC_i$> to the 5th adder 206, the switch 208 and the FFE circuit 30 via the line L14.

Meanwhile, the FFE circuit 30 performs FFE on the $IS_i$ based on a previously obtained (i-1)st set (<$SIFC_{i-1}$>) having k number of FFE coefficients ($B_1$ to $B_k$) to thereby provide an ith set (<$SIS_i$>) having k number of interpolated sample values ($L_1$ to $L_k$) to the FFE coefficients updating circuit 35 through the line L13 and a first equalized data to the adder 50 via a line L16.

And the DFE circuit 40 performs DFE on the $D_{i-1}$ based on a previously obtained (i-1)st set (<$SDC_{i-1}$>) of DFE coefficients having k number of DFE coefficients ($J_1$ to $J_k$) to thereby provide an ith set (<$SD_i$>) having k number of decision values ($Q_1$ to $Q_k$) to the DFE coefficients updating circuit 45 via a line L11 and a second equalized data to the adder 50 via a line L17.

Figure 5:
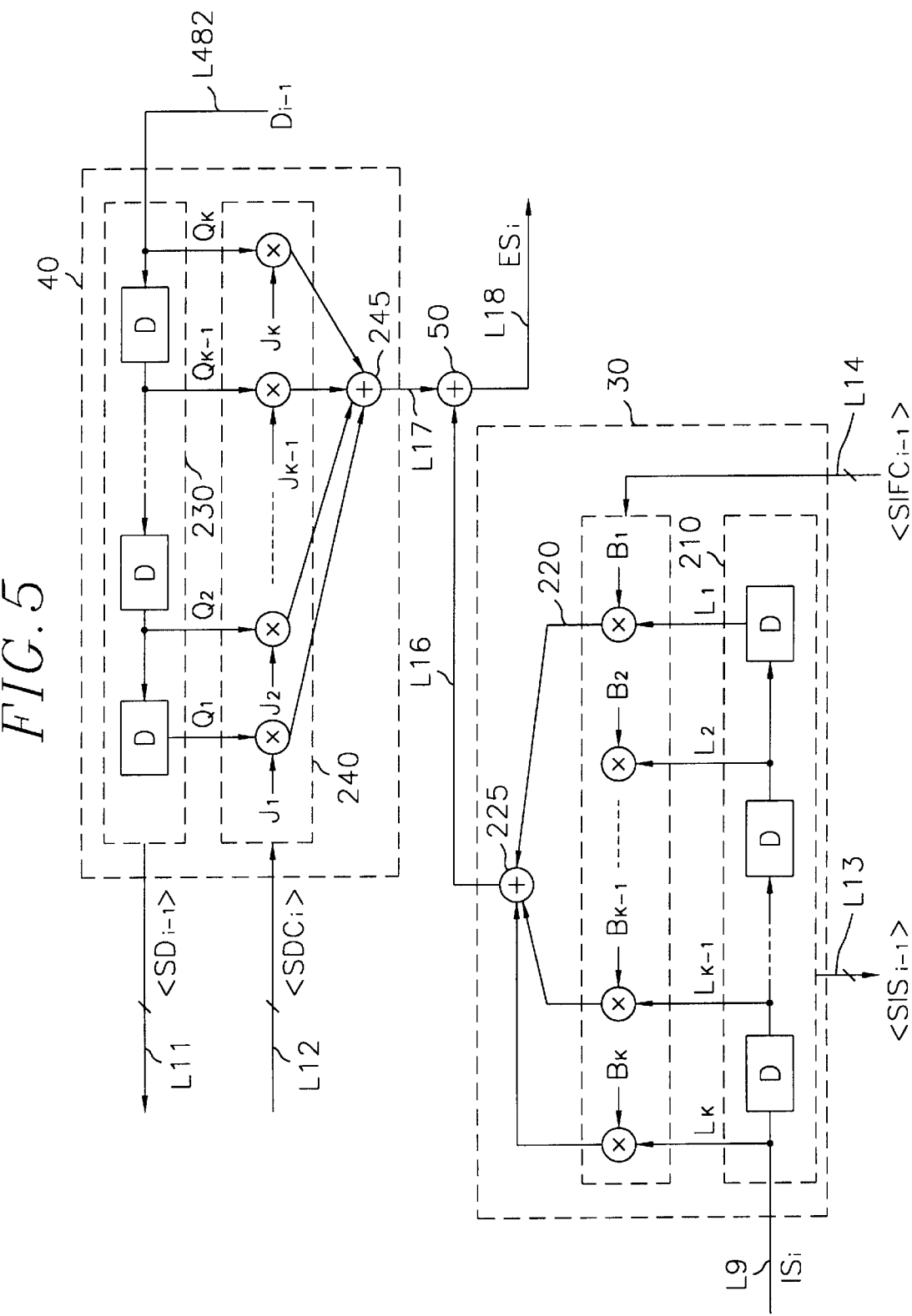
FIG. 5 reveals a detailed block diagram showing a FFE circuit and a decision feedback equalization (DFE) circuit of the data detection apparatus illustrated in FIG. 2.

In detail, referring to FIG. 5, there is revealed a detailed block diagram showing the FFE circuit 30 and the DFE circuit 40 of the data detection apparatus 10 illustrated in FIG. 2. The FFE circuit 30 contains a first tapped delay circuit 210, a first multiplying circuit 220 and a 3rd adder 225. The DFE circuit 40 contains a second tapped delay circuit 230, a second multiplying circuit 240 and a 4th adder 245.

The first tapped delay circuit 210 delays each of $L_1$ to $L_k$ of the <$SIS_{i-1}$> by the DD by using the $IS_i$ to thereby provide a delayed set <$SIS_i$> having delayed $L_1$ to $L_k$ as the <$SIS_i$> to the FFE coefficients updating circuit 35 via the line L13. The first multiplying circuit 220 multiplies the delayed $L_1$ to $L_k$ of the delayed <$SIS_i$> with $B_1$ to $B_k$ of <$SIFC_{i-1}$>, respectively, thereby supplying first respective multiplied values to the 3rd adder 225. The 3rd adder 225 sums up the first respective multiplied values together to thereby provide the first equalized data to the adder 50 via the line L16.

The second tapped delay circuit 230 in the DFE circuit 40 delays each of $Q_1$ to $Q_k$ by the DD of the <$SD_{i-1}$> by using the $D_i$ to thereby provide <$SD_i$> having delayed $Q_1$ to $Q_k$ as the <$SD_i$>to the DFE coefficients updating circuit 45 via the line L11. And the second multiplying circuit 240 multiplying circuit multiplies the delayed $Q_1$ to $Q_k$ of the <$SD_i$> by $J_1$ to $J_k$ of the <$SD_{i-1}$>, respectively, thereby supplying second respective multiplied values to the 4th adder 245. The 4th adder 245 sums up the second respective multiplied values together to thereby provide the second equalized data to the adder 50 via the line L17.

The adder 50 adds the first equalized data to the second equalized data, thereby providing the added result as the $ES_i$ to the subtractor 55 and the MLSD channel 60 through the line L18.

The MLSD channel 60 performs MLSD on the $ES_i$ to detect most likely sequences or survivor paths, thereby supplying an ith binary data value ($BD_i$) representing a final survivor path obtained therein and an ith decision value ($D_i$), $D_{i-1}$ and an (i–2)nd decision value ($D_{i-2}$) representing survivor paths detected therein, wherein the MLSD is performed based on the SL and CLR in the synchronous mode and performed based on the SL, CLR and $H_{i-1}$ in the asynchronous mode.

Figure 6:
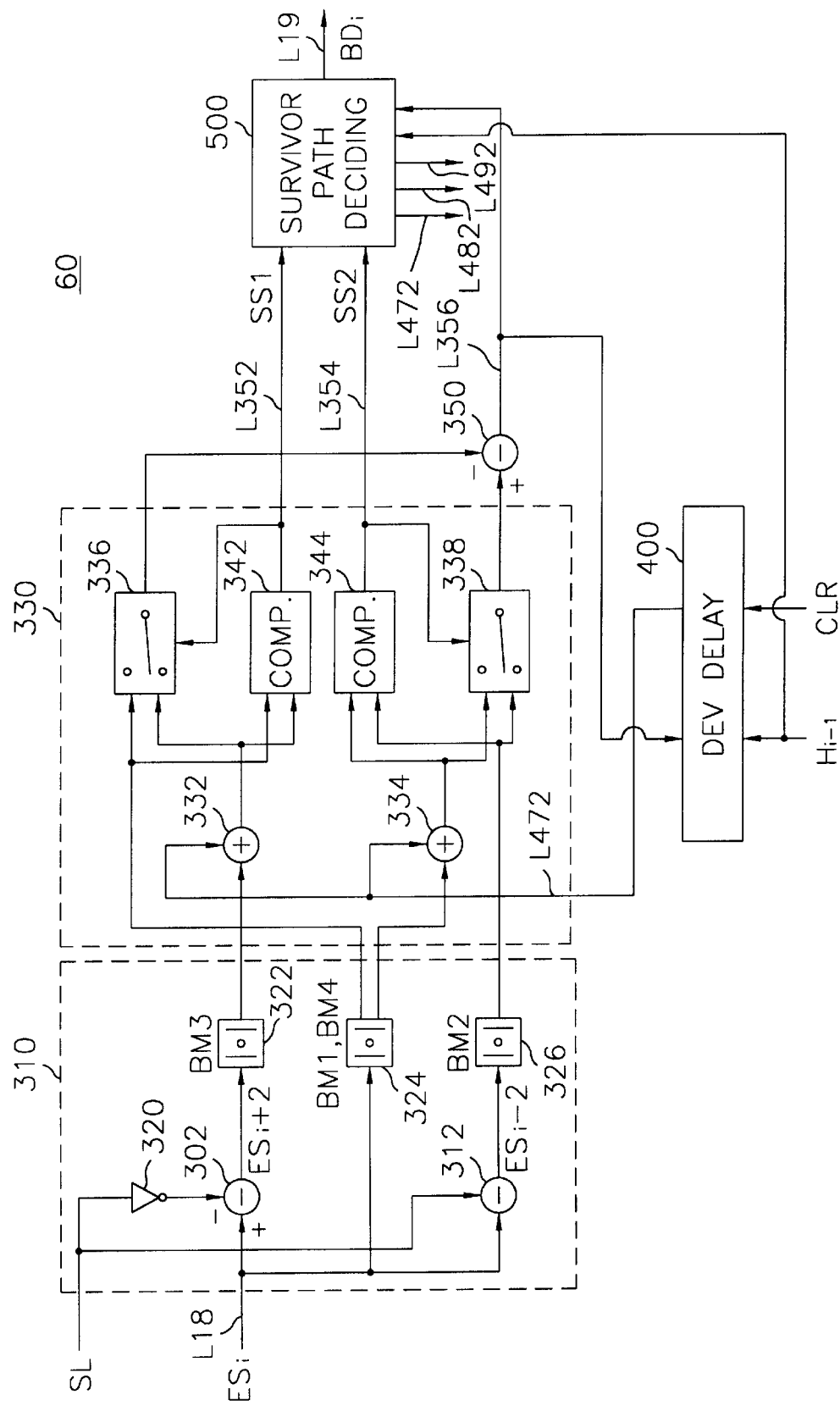
FIG. 6 shows a detailed block diagram of a maximum likelihood sequence detection (MLSD) channel within the data detection apparatus illustrated in FIG. 2.

Referring to FIG. 6, there is shown a detailed block diagram of the MLSD channel 60 within the data detection apparatus 10 illustrated in FIG. 2. The MLSD channel 60 includes a branch metric providing circuit 310, a branch metric comparison circuit 330, a difference evaluation value (DEV) delaying circuit 400, an error metric subtractor 350 and a survivor path deciding circuit 500.

Figure 10:
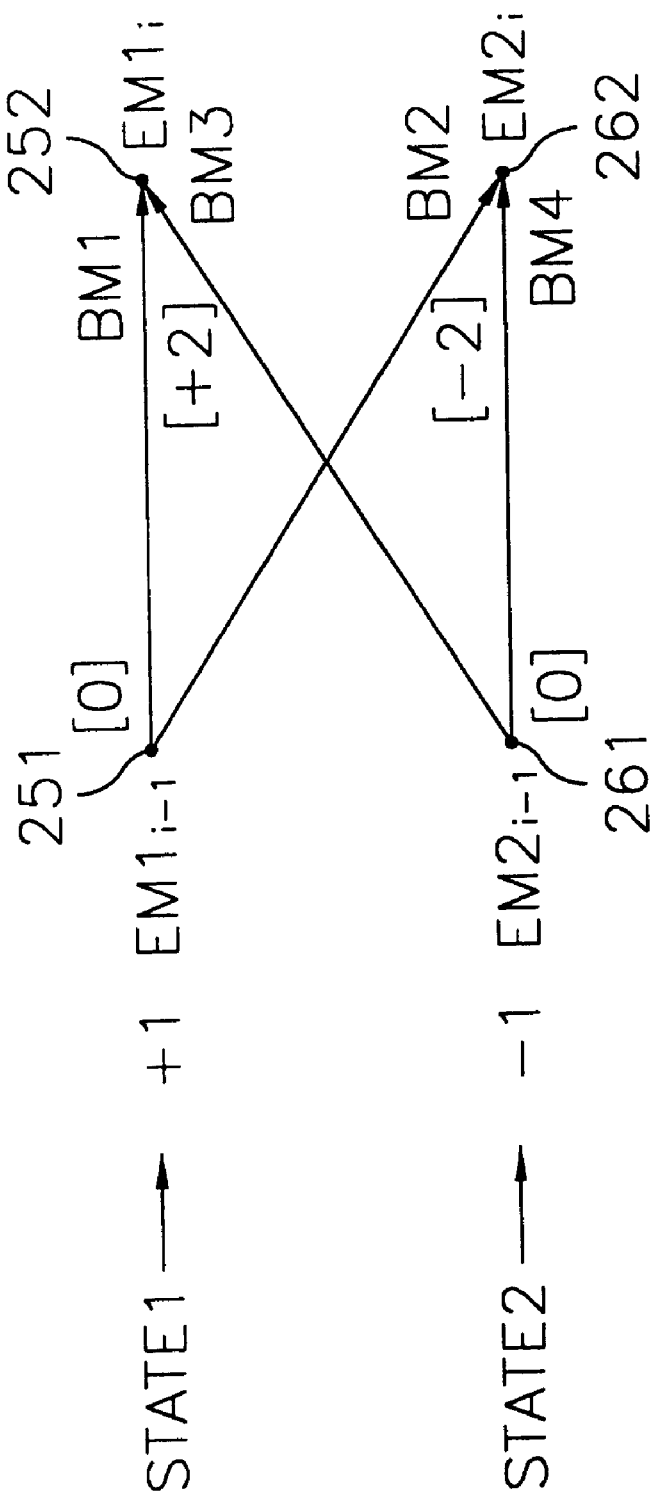
FIG. 10 sets forth a trellis diagram representing a de-interleaved symbol stream for use in explaining partial response 4 technique employed in the MLSD channel illustrated in FIG. 6.

FIG. 10 sets forth a trellis diagram representing de-interleaved symbol stream for use in explaining partial response 4 technique employed in MLSD channel 60 illustrated in FIG. 6. In FIG. 10, upper points 251 and 252 represent a state 1 (S1) and lower points 261 and 262 represent a state 2 (S2). Left points 251 and 261 show a previous trellis state ((i–1)st trellis state) and right points 252 and 262 show a current trellis state (ith trellis state).

Each of the points 251, 252, 261 and 262 relates to a corresponding error metric (EM). In detail, in FIG. 10, an (i–1)st error metric ($EM1_{i-1}$) relates to the point 251 of S1. $EM2_{i-1}$ relates to the point 261 of S2. $EM1_i$ relates to the point 252 of S1. $EM2_i$ relates to the point 262 of S2. And in FIG. 10, if the MLSD channel 60 received 1 at (i–1)st S1, the trellis proceeds to ith S2.

And in FIG. 10, if the MLSD channel 60 received 0 at (i–1)st S1, the trellis proceeds to ith S1. And in FIG. 10, each of values [0], [+2] and [–2] illustrates a corresponding equalized channel data value to get a corresponding transition of the state. In the present invention, this equalized channel data [0], [+2] and [–2] are referred to decision values representing survivor paths.

Meanwhile, in FIG. 10, each of branch metrics BM1 to BM4 represents a difference between an idealized equalization data and a real input data (or a real sample data). For example, in FIG. 10, at the point 251, if the MLSD channel 60 receives 0, the trellis proceeds to the point 252. In this case, the $EM1_{i-1}$ and the BM1 are added together to thereby render an ith first candidate error metric $C1EM1_i$.

And at the point 261, if the MLSD channel 60 receives 1, the trellis proceeds to the point 252. In that case, the $EM2_{i-1}$ and the BM3 are added together to thereby render an ith second candidate error metric $C2EM1_i$. And then, if the $C1EM1_i$ is less than the $C2EM1_i$, the $C1EM1_i$ is selected as the $EM1_i$ and if otherwise, the $C2EM1_i$ is selected as an ith error metric ($EM1_i$).

In a similar manner described above, if the MLSD channel 60 receives 1 at the point 251, the trellis proceeds to the point 262. In this case, the $EM1_{i-1}$ and the BM2 are added together to thereby render an ith first candidate error metric $C1EM2_i$. And at the point 261, if the MLSD channel 60 receives 0, the trellis proceeds to the point 262. In this case, the $EM2_{i-1}$ and the BM4 are added together to thereby render an ith second candidate error metric $C2EM2_i$.

And then, if the $C1EM2_i$ is less than the $C2EM2_i$, the $C1EM2_i$ is selected as an error metric $EM2_i$ and if otherwise, the $C2EM2_i$ is selected as an error metric $EM2_i$. In this way, most likely sequence or path for each point is finally obtained by updating the error metrics.

Referring back to FIG. 6, the branch metric providing circuit 310, based on the $ES_i$ and the SL inputted thereto from the MCU 90, provides first to 4th branch metrics (BM1, BM2, BM3 and BM4) to the branch metric comparison circuit 330 by using a predetermined branch metric generation method.

In detail, the SL is fed as an ideal equalized data to a subtractor 312 and at the same time the SL is phase-inverted at an inverter 320 as an inverted SL to be transmitted to a subtractor 302. And $ES_i$ is fed to the subtractor 302, an absolute value calculation circuit 324 and the subtractor 312. From now on, for simplicity, the SL is set to 2.

The subtractor 312 subtracts SL, i.e., 2 from the $ES_i$ to thereby supply the subtraction result as a second subtracted value (i.e., $ES_i-2$) to an absolute value calculation circuit 326. The absolute value calculation circuit 326 then provides the absolute value of the second subtracted value received as the second branch metric (BM2) to a comparator 344 and a switch 338 in the branch metric comparison circuit 330.

The subtractor 302 subtracts the inverted SL, i.e., –2 from the $ES_i$ to thereby supply the subtraction result as a first subtracted value (i.e., $ES_i-(-2)=(ES_i+2)$) to an absolute value calculation circuit 322.

The absolute value calculation circuit 322 then provides the absolute value of the first subtracted value received as the third branch metric (BM3) to an adder 332 in the branch metric comparison circuit 330.

The absolute value calculation circuit 324 calculates the absolute value of a subtracted value obtained by subtracting the ESi from 0.0 as each of the first and the 4th branch metrics (BM1, BM4). And the absolute value calculation circuit 324 provides the BM1 to a switch 336 and a comparator 342; and provides the BM4 to the adder 334.

The branch metric comparison circuit 330 generates a first state control signal (SS1) for a state 1 of the $ES_i$ (S1), a second state control signal (SS2) for a state 2 of the $ES_i$ (S2), an ith first error metric ($EM1_i$) and an ith second error metric ($EM2_i$) based on the branch metrics BM1 to BM4 and a previously obtained (i–1)st difference evaluation value ($DEV_{i-1}$) by using a predetermined branch metric comparison technique.

In detail, the adder 332 adds the BM3 to the $DEV_{i-1}$ inputted thereto from a difference evaluation value (DEV) delay circuit 400, thereby supplying the added result as a first added value to the switch 336 and the comparator 342. And the adder 334 adds the BM4 to the $DEV_{i-1}$, thereby supplying the added result as a second added value to the switch 338 and the comparator 344. It should be noted here that the $DEV_{i-1}$ is obtained by subtracting a previously obtained (i–1)st first error metric ($EM1_{i-1}$) for S1 from a previously obtained (i–1)st second error metric ($EM2_{i-1}$) for S2.

The comparator 342 compares the BM1 with the first added value to thereby supply 0 as the SS1 for S1 to the survivor path deciding circuit 500 via a line L352 and at the same time controls the switch 336 to supply the BM1 as an ith error metric ($EM1_i$) for S1 to the error metric subtractor 350 if the BM1 is less than the first added value; and if otherwise, supply 1 as the SS1 for S1 to the survivor path deciding circuit 500 via the line L352 and at the same time controls the switch 336 to supply the first added value as an ith error metric ($EM1_i$) for S1 to the error metric subtractor 350.

The comparator 344 compares BM2 with the second added value to thereby supply 0 as a SS2 for S2 to the survivor path deciding circuit 500 via a line L354 and at the same time controls the switch 338 to supply the BM2 as an ith error metric ($EM2_i$) for S2 to the error metric subtractor

350 if the BM2 is less than the second added value; and if otherwise, supply 1 as a SS2 for S2 to the survivor path deciding circuit 500 via the line L354 and at the same time control the switch 338 to supply the second added value as the ith error metric (EM2$_i$) for S2 to the error metric subtractor 350.

The subtractor 350 subtracts the EM1$_1$ from the EM2 to thereby provide an ith difference evaluation value (DEV$_i$) to the DEV delay circuit 400 and the survivor path deciding circuit 500 through a line L356.

The DEV delaying circuit 400 delays DEV$_i$ by the DD either based on the DEV$_{i-1}$ and CLR in the synchronous mode or based on the CLR DEV$_{i-1}$ and H$_{i-1}$ in the asynchronous mode to thereby provide a delayed DEV$_i$ as a previously obtained ith DEV (DEV$_i$) to the branch metric comparison circuit 330.

Figure 7:
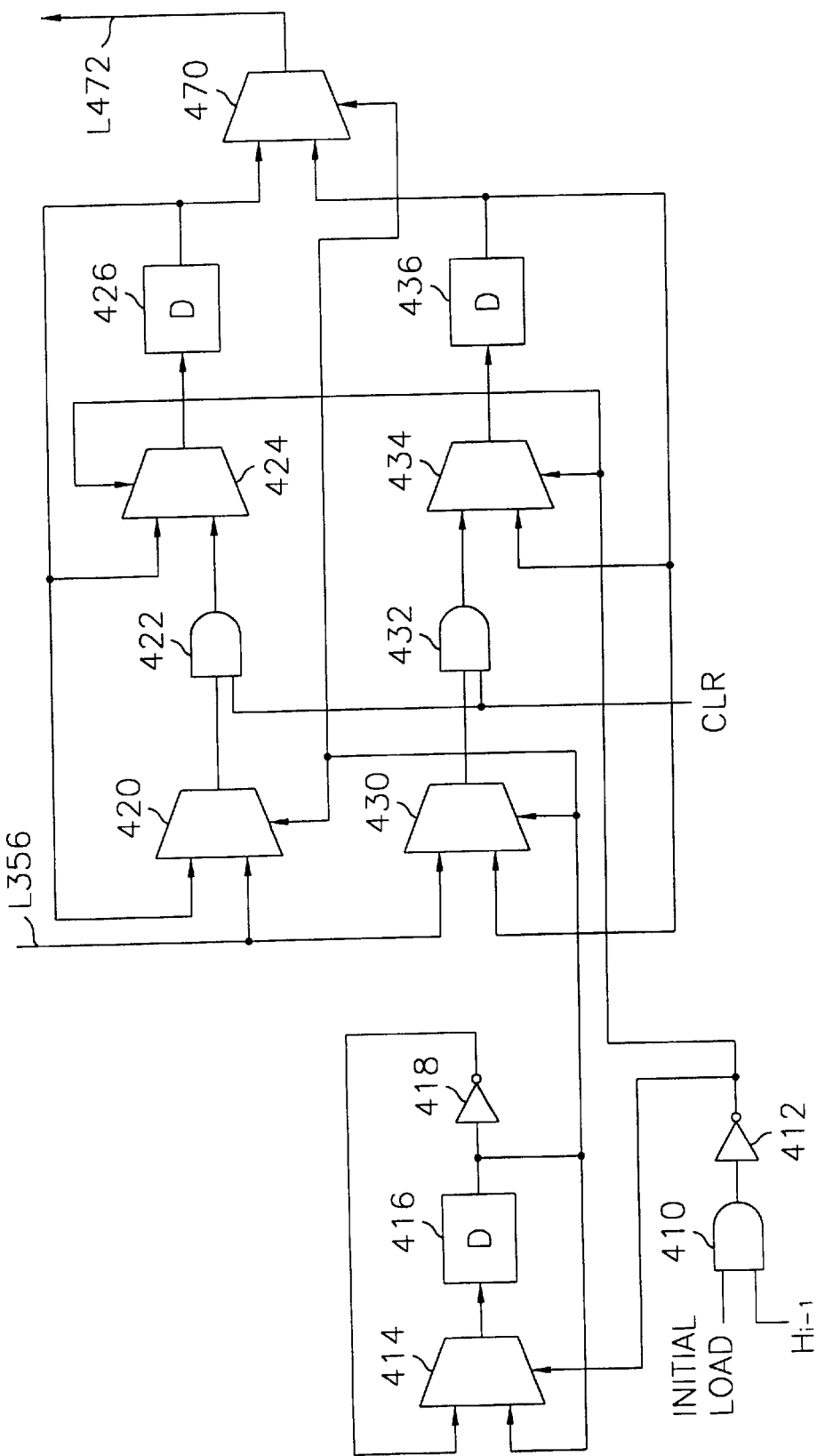
FIG. 7 represents a detailed block diagram of a decision evaluation value (DEV) delay circuit within the MLSD channel shown in FIG. 6.

Referring to FIG. 7, there is represented a detailed block diagram of the DEV delay circuit 400 within the MLSD 60 shown in FIG. 6. As can be easily understood in FIG. 7, a first input terminal of a multiplxer (MUX) 420 is connected to the line L356. And a second input terminal of the MUX 420 is connected to an output terminal of a delay 426. A first input terminal of a MUX 430 is connected to the line L356. And a second input terminal of the MUX 430 is connected to an output terminal of a delay 436.

An output terminal of the MUX 420 is connected to a first input terminal of an AND gate 422. The CLR is fed to a second input terminal of the AND gate 422. An output terminal of the AND gate 422 is connected to a second input terminal of a MUX 424. The output terminal of MUX 424 is connected to the delay 426. The output terminal of the delay 426 is also connected to a first input terminal of the MUX 424, a first input terminal of the MUX 420 and a first input terminal of a MUX 470.

A second input terminal of the MUX 434 is connected to an output terminal of a delay 436. An output terminal of the MUX 430 is connected to a first input terminal of an AND gate 432. And the CLR is fed to a second input terminal of the AND gate 432. The output terminal of the AND gate 432 is connected to a first input terminal of a MUX 434. The output terminal of the MUX 434 is connected to the delay 436. The output of the delay 436 is connected to the second input terminal of the MUX 430, the second input terminal of the MUX 434 and a second input terminal of the delay 470.

Meanwhile, a preset initial load input and the H$_{i-1}$ (if exists) are fed to a first input terminal and a second input terminal of an AND gate 410, respectively. The output terminal of the AND gate 410 is connected to an inverter 412. And an inverted signal by the inverter 412 is fed as a MUX control signal to a MUX 414, MUX 434 and MUX 424.

An output of the MUX 414 is supplied to a delay 416. And an output of the delay 416 is supplied to an inverter 418, a second input terminal of the MUX's 414, 430, 420 and 470. And the output of the inventer 418 is transmitted to a first input terminal of the MUX 414. The survivor path deciding circuit 500 as a viterbi detector decides a survivor path either by using the SS1, SS2 and DEV$_i$ in the synchronous mode or based on the SS1, SS2, DEV$_i$ and H$_{i-1}$ in the asynchronous mode by employing a predetermined survivor path deciding method to thereby supply the BD through a line L19, the D$_i$ via a line L472, the D$_{i-1}$ through a line L482 and D$_{i-2}$ via a line L492.

Figure 8:
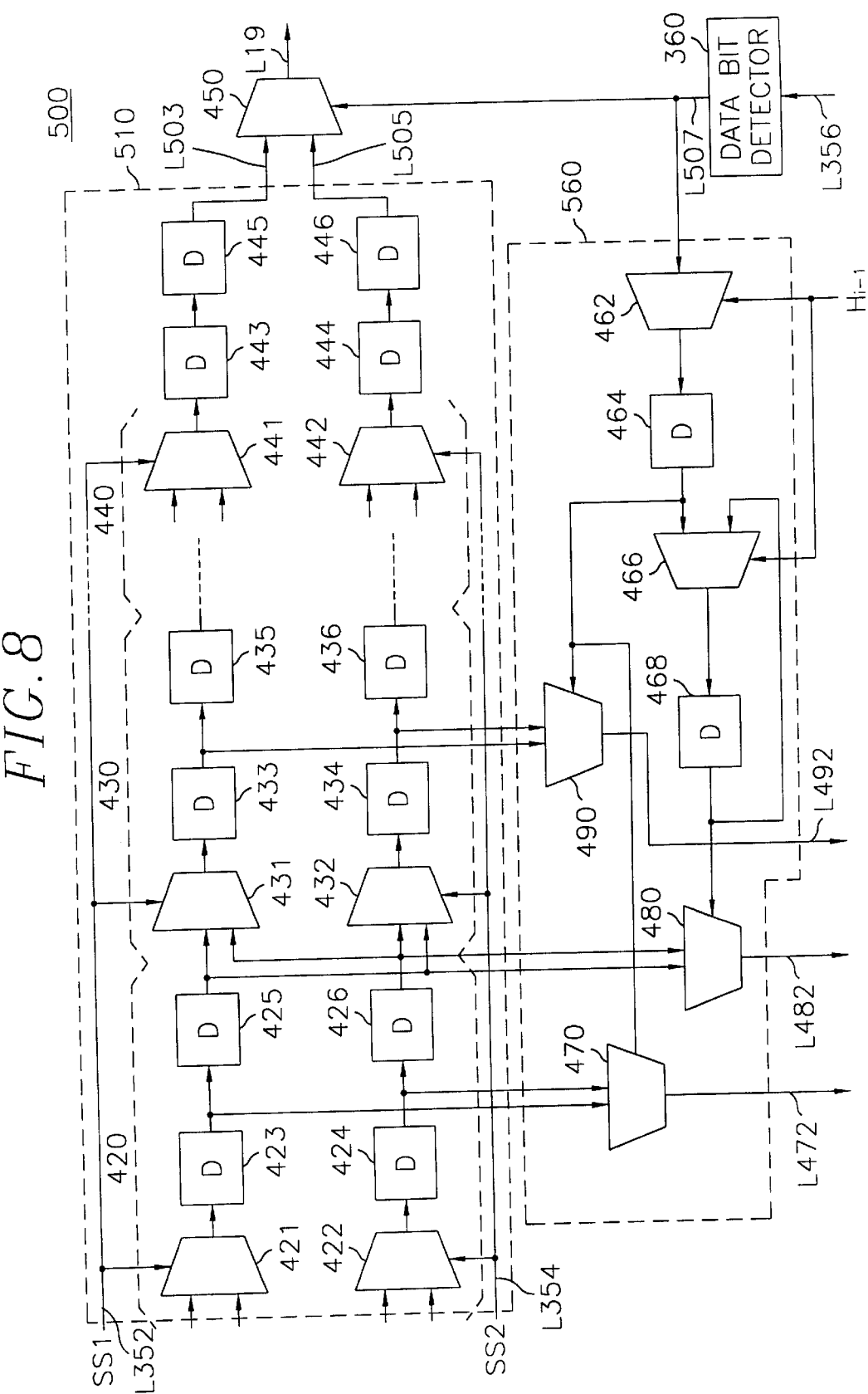
FIG. 8 presents a detailed block diagram of a survivor path deciding circuit within the MLSD channel shown in FIG. 6.

Referring to FIG. 8, there is presented a detailed block diagram of a survivor path deciding circuit 500 within the MLSD channel 60 shown in FIG. 6. The survivor path deciding circuit 500 contains a survivor path selection module 510, a data bit detector 360, a decision value generating circuit 560 and a MUX 450.

The survivor path selection module 510, by employing a predetermined survivor path selection method, selects and then provides a first final survivor path value for the ES$_i$ based on the SS1 and a second final survivor path value based on the SS2. And at the same time, the survivor path selection module 510 supplies a first candidate decision value (C1DV) set (<C1DV>) having an ith first candidate decision value (C1D$_i$), an (i−1)st first candidate decision value (C1D$_{i-1}$) and (i−2)nd first candidate decision value (C1D$_{i-2}$) for the ES$_i$ based on the SS1 and at the same time supplies a second candidate decision value (C2DV) set (<C2DV>) having an ith second candidate decision value (C2D$_i$), an (i−1)st second candidate decision value (C2D$_{i-1}$) and (i−2)nd second candidate decision value (C2D$_{i-2}$) for the ES$_i$ based on the SS2.

In detail, the survivor path selection module 510 contains survivor path storing/updating circuits 420, 430 and 440 for use in determining survivor paths for S1 and S2. The survivor path storing/updating circuit 420 has a MUX 421, delays 423 and 425 to be used to determine survivor paths for S1 and a MUX 422, delays 424 and 426 to be used to determine survivor paths for S2.

The survivor path storing/updating circuit 430 has a MUX 431, delays 433 and 435 to be used to determine survivor paths for S1 and a MUX 432, delays 434 and 436 to be used to determine survivor paths for S2. The survivor path storing/updating circuit 440 has a MUX 441, delays 443 and 445 to be used to determine survivor paths for S1 and a MUX 442, delays 444 and 446 to be used to determine survivor paths for S2.

Each of control signal input terminals of the MUX 421, MUX 431 and MUX 441 is connected to the line L352. Two input terminals of MUX 421 are connected to signal sources (not shown) providing 0 or −2. Two input terminals of the MUX 431 are connected to the output terminals of delays 425 and 426, respectively. Two input terminals of the MUX 441 are connected to output terminals of corresponding delays (not shown), respectively.

Each of control signal input terminals of the MUX 422, MUX 432 and the MUX 442 is connected to the line L354. Two input terminals of the MUX 422 are connected to signal sources (not shown) providing 0 or +2. Two input terminals of the MUX 432 are connected to the output terminals of delays 425 and 426, respectively. Two input terminals of the MUX 442 are connected to the output terminals of corresponding delays (not shown), respectively.

As a result, the C1D$_i$ is fed to a first input terminal of the MUX 470 from the delay 423 and the C2D$_i$ is fed to a second input terminal of the MUX 470 from the delay 424. The C1D$_{i-1}$ is fed to a first input terminal of a MUX 480 from the delay 425 and the C2D$_{i-1}$ is fed to a second input terminal of the MUX 480 from the delay 426. And the C1D$_{i-2}$ is fed to a first input terminal of a MUX 490 from the delay 433 and the C2D$_{i-2}$ is fed to a second input terminal of the MUX 490 from the delay 434.

The output of the delay 445 is fed to a first input terminal of the MUX 450 via a line L503. And the output of the delay 446 is fed to a second input terminal of the MUX 450 via a line L505. And an output, i.e., a coded data bit of the bit data detector 360 is supplied as a MUX control signal to the MUX 450 and at the same time as an input signal to a MUX 462 in the decision value generating circuit 560 via a line L507.

The data bit detector 360 provides 0 on the line L507 as a coded data bit if $DEV_i$ inputted thereto through the line L356 from the error metric subtractor 350 is greater than 0 and provides 1 as a coded data bit if the $DEV_i$ is less than 0 based on the $DEV_i$.

Figure 11:
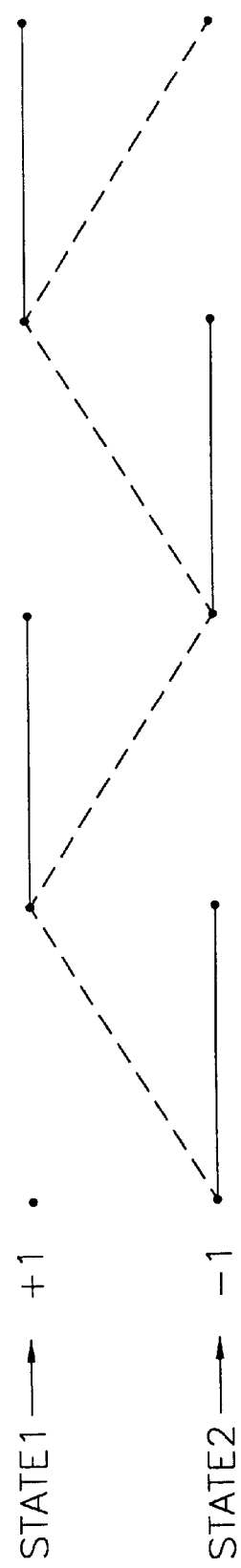
FIG. 11 offers a state diagram showing paths for a state 1 and a state 2 generated or selected by a survivor path selection module within the survivor path deciding circuit shown in FIG. 8.

FIG. 11 offers a state diagram showing paths for S1 and S2 generated or selected by the survivor path selection module 510 within the survivor path deciding circuit 500 shown in FIG. 8. In FIG. 11, the dot line represents a final survivor path and the solid line shows candidate survivor paths relating to corresponding candidate decision values, respectively.

From now on, referring to FIG. 11, the operation of the survivor path selection module 510 will be described. First, it is assumed that the SS1 and the SS2 at data detection times (or sequences) T1, T2, T3 and T4 are given in [TABLE 1].

TABLE 1

|  | T1 | T2 | T3 | ... | T4 |
|---|---|---|---|---|---|
| SS1 | 1 | 0 | 1 | ... | 0 |
| SS2 | 0 | 1 | 0 | ... | 1 |

Then path memory values in delays 423/424, 433/434 and 443/444 at T1 are given in [TABLE 2].

TABLE 2

|  | delays (423/424) | delays (433/434) | ... | delays (443/444) |
|---|---|---|---|---|
| S1 | −2 | 0 | ... | 0 |
| S2 | 0 | 0 | ... | 0 |

Then path memory values in delays 423/424, 433/434 and 443/444 at T2 are given in [TABLE 3].

TABLE 3

|  | delays (423/424) | delays (433/434) | ... | delays (443/444) |
|---|---|---|---|---|
| S1 | 0 | −2 | ... | 0 |
| S2 | +2 | −2 | ... | 0 |

Then path memory values in delays 423/424, 433/434 and 443/444 at T3 are given in [TABLE 4].

TABLE 4

|  | delays (423/424) | delays (433/434) | ... | delays (443/444) |
|---|---|---|---|---|
| S1 | −2 | +2 | ... | 0 |
| S2 | 0 | +2 | ... | 0 |

Then path memory values in delays 423/424, 433/434 and 443/444 at T4 are given in [TABLE 5].

TABLE 5

|  | delays (423/424) | delays (433/434) | ... | delays (443/444) |
|---|---|---|---|---|
| S1 | 0 | −2 | ... | +2 |
| S2 | +2 | −2 | ... | +2 |

The MUX 450 performs multiplexing on the first final survivor path value and the second final survivor path value based on the coded data bit to thereby supply the $BD_i$ having either 1 or 0 on the line L19, wherein each of the first and the second survivor paths represents a value obtained by using a predetermined survivor path detection method, e.g., a viterbi detection algorithm.

In detail, the MUX 450 receives one of candidate survivor path values +2, −2 and 0 from each of the delays 445 and 446. And then the MUX 450 supplies 1 as the $BD_i$ on the line L19 if +2 or −2 is inputted therein and 0 as the $BD_i$ on the line L19 if 0 is inputted therein based on the coded data bit under the condition that SL is 2.

Meanwhile, a decision value generating circuit 560 generates the $D_i$, $D_{i-1}$ and $D_{i-2}$ on lines L472, L482 and L492, respectively by using the <C1DV> and the <C2DV> either based on the coded data bit in the synchronous mode or based on the coded data bit and the $H_{i-1}$ in the asynchronous mode.

In detail, an output of the MUX 462 in the decision value generating circuit 560 is fed to a delay 464. The output terminal of the delay 464 is connected to a first input terminal of a MUX 466, MUX 470 and MUX 490. An output of the MUX 466 is supplied to a delay 468. And an output terminal of the delay 468 is connected to the MUX 480 and a second input terminal of the MUX 466.

Further, in the asynchronous mode, the $H_{i-1}$ is fed to the MUX 462 and the MUX 466. Meanwhile, each of the outputs of the MUX 470 and the MUX 490 is controlled by the output of the delay 464. And the output of the MUX 480 is controlled by the output of the delay 468.

As a result, the MUX 470 of the decision value generating circuit 560 generates the $C1D_i$ as the $D_i$ on the line L472 if the $C1D_i$ is less than the $C2D_i$, if otherwise the $C2D_i$ as the $D_i$ on the line L472. The MUX 480 of the decision value generating circuit 560 generates the $C1D_{i-1}$ as the $D_{i-1}$ on the line L482 if the $C1D_{i-1}$ is less than the $C2D_{i-1}$, if otherwise the $C2D_{i-1}$ as the $D_{i-1}$ on the line L482. The MUX 490 of the decision value generating circuit 560 generates the $C1D_{i-2}$ as the $D_{i-2}$ on the line L492 if the $C1D_{i-2}$ is less than the $C2D_{i-2}$, if otherwise the $C2D_{i-2}$ as the $D_{i-2}$ on the line L492.

Referring back to FIG. 2, the subtractor 55 subtracts the $D_{i-1}$ inputted thereto via the line L482 from the $ES_i$ fed thereto via the line L18 to thereby produce the $E_i$. The $E_i$ is fed to the FFE coefficients updating circuit 35 and the phase error detector 70.

Meanwhile, the phase error signal providing circuit 100 obtains a phase error signal based on the $D_i$, $D_{i-2}$ and $E_{i-1}$ to thereby supply the phase error signal as an ith phase error signal ($PE_i$) on the line L495. And the SCS generating circuit 160, based on the W and the $PE_i$, generates and then provides an ith sampling clock signal ($SCS_i$) on the line L15.

In detail, the phase error detector 70 in the phase error signal providing circuit 100 performs phase error detection based on the $D_i$, $D_{i-2}$ and $E_{i-1}$ to thereby provide an ith phase error detection signal to the loop filter 80. The loop filter 80 performs loop filtering on the ith phase error detection signal to thereby provide the PEi to the interpolation filter 20 and the D/A converter 170 in the SCS generating circuit 160 via the line L495.

Figure 9:
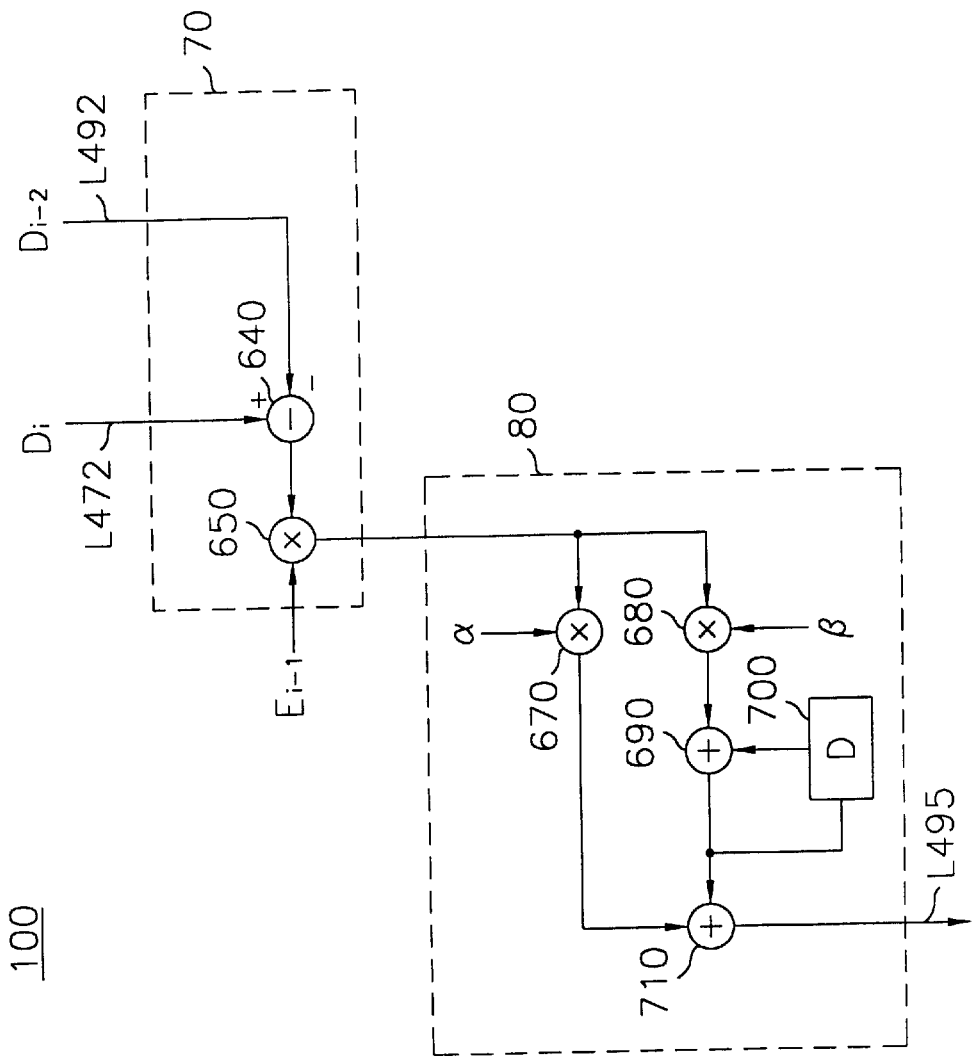
FIG. 9 describes a detailed block diagram of a phase error detector and a loop filter within a phase error signal providing circuit illustrated in FIG. 2.

Referring to FIG. 9, there is described a detailed block diagram of the phase error detector 70 and the loop filter 80 within the phase error signal providing circuit 100 illustrated in FIG. 2. The phase error detector 70 contains a phase error subtractor 640 and a 5th multiplier 650. The loop filter 80 contains a 6th multiplier 670, a 7th multiplier 680, a 6th adder 690, a phase error delay circuit 700 and a 7th adder 710.

The phase subtractor 640 subtracts the $D_{i-2}$ from the $D_i$ to thereby provide a subtracted phase error value to the 5th multiplier 650. The 5th multiplier 650 multiplies the subtracted phase error value by the $E_{i-1}$ to thereby provide the an phase error detection signal to the 6th multiplier 670 and the 7th multiplier 680 in the loop filter 80.

The 6th multiplier 670 multiplies the ith phase error detection signal by α, α being a predetermined constant, to thereby supply an ith first phase error data value to the 7th adder 710. The 7th multiplier 680 multiplies the ith phase error detection signal by β, β being a predetermined constant, to thereby supply an ith second phase error to the 6th adder 690. The 6th adder 690 adds the ith second phase error data to a previously obtained (i−1)st second phase error to thereby supply an ith third phase error to the 7th adder 710 and the phase error delay circuit 700.

The phase error delay circuit 700 delays the ith second phase error by the DD to thereby provide a delayed ith second phase error as a previously obtained ith second phase error to the 6th adder 690. And the 7th adder 710 adds the ith first phase error to the ith third phase error to thereby supply $PE_i$ on the line L495.

The D/A converter 170 in the SCS generating circuit 160 converts the $PE_i$ to thereby provide an ith analog voltage level to the mode selection circuit 190. The mode selection circuit 190 performs mode selection based on the W to select the synchronous mode if the W is equal to 1, thereby providing the analog voltage level as an ith analog voltage signal to the VCO circuit 180.

And the mode selection circuit 190 selects the asynchronous mode if the W is not equal to 1, thereby providing a predetermined constant analog voltage level as an ith analog voltage signal to the VCO circuit 180. The VCO 180 carries out voltage controlled oscillation (VCO) on the ith analog voltage signal, thereby supplying the $SCS_i$ to the A/D converter 16.

As described above, the synchronous/asynchronous data detection apparatus in accordance with the present invention utilizes output data sequence from a MLSD channel to equalize sample values in an equalization circuit to perform phase error detection and SCS control, thereby decreasing the transmission error rate and enhancing the data detection efficiency thereof.

While the present invention has been shown and described with reference to those skilled in the art that many changes and modifications may be without departing from the spirit and scope of the invention as defined in the appended claims.

What is claimed is:

1. A synchronous/asynchronous data detection apparatus for use in a magnetic recording/playback system provided with a magnetic head having a read element to detect N number of binary data values, N being a predetermined positive integer, from analog playback signals being obtained through preamplifying magnetic flux transitions induced by the read element of the magnetic head from a magnetic recording medium to a predetermined level, wherein the system is operated in either a synchronous mode or an asynchronous mode, the apparatus comprising:

means for generating system control signals including a set of first signals having a set of feedforward equalization (FFE) initial filter coefficients (<FFE_IFC>), a set of decision feedback equalization (DFE) initial filter coefficients (<DFE_IFC>), a FFE initial load (FFE_IL), a DFE initial load (DFE_IL), a FFE convergence constant (FFE_μ) and a DFE convergence constant (DFE_μ); and a set of second signals having a ratio signal (W) of a data detection frequency over a predetermined recording frequency, a predetermined clear signal (CLR) and a predetermined slice level (SL), wherein the W is equal to 1 in the synchronous mode and the W is not equal to 1 in the asynchronous mode;

means for analog to digital (A/D) converting an ith analog playback signal into digital playback data at a sampling rate predetermined in accordance with a previously obtained (i−1)st sampling clock signal ($SCS_{i-1}$) to thereby provide an ith sample value ($S_i$), wherein i is a positive integer representing a data detection order;

means for performing interpolation filtering on $S_i$ based on the W and a previously obtained (i−1)st phase error signal ($PE_{i-1}$) in the synchronous/asynchronous mode to thereby provide an ith interpolated sample value ($IS_i$) and further provide an ith hold signal ($H_i$) when a predetermined hold condition is satisfied in the asynchronous mode, wherein i ranges from 1 to N;

means for performing adaptive equalization on the $IS_i$ to thereby supply an ith equalized sample value ($ES_i$), wherein said adaptive equalization is performed based on the first signal set, a previously obtained (i−1)st decision value ($D_{i-1}$) and a previously obtained (i−1)st error signal ($E_{i-1}$) in the synchronous mode and performed based on the first signal set, the $E_{i-1}$, the $D_{i-1}$ and a previously obtained (i−1)st hold signal ($H_{i-1}$) in the asynchronous mode;

means for performing maximum likelihood sequence detection (MLSD) on the $ES_i$ to detect survivor paths, thereby supplying an ith binary data value ($BD_i$) representing a final survivor path obtained therein and an ith decision value ($D_i$), $D_{i-1}$ and an (i−2)nd decision value ($D_{i-2}$) representing survivor paths detected therein, wherein the MLSD is performed based on the SL and the CLR in the synchronous mode and performed based on the SL, CLR and $H_{i-1}$ in the asynchronous mode;

means for subtracting the $D_{i-1}$ from the $ES_i$ to thereby produce an ith error signal ($E_i$);

means for obtaining a phase error signal based on the $D_i$, $D_{i-2}$ and $E_{i-1}$ to thereby supply the phase error signal as an ith phase error signal ($PE_i$); and means, based on the W and the $PE_i$, for generating an ith sampling clock signal ($SCS_i$).

2. The apparatus according to claim 1, wherein said adaptive equalization means includes:

means for performing, in the synchronous mode, FFE coefficient updating based on the FFE_IL, <FFE_IFC>, FFE_μ, $E_{i-1}$ and a previously obtained (i−1)st set (<$SIS_{i-1}$>) having k number of interpolated sample values ($L_1$ to $L_k$) to thereby supply an ith set (<$SFC_i$>) of FFE coefficients having k number of FFE coefficients ($B_1$ to $B_k$), k being a predetermined positive integer, and in the asynchronous mode, performing FFE coefficient updating based on the <$SIS_{i-1}$>, FFE_IL, <FFE_IFC>, FFE_μ, $E_{i-1}$ and $H_{i-1}$ to thereby supply an <$SFC_i$>; and means for performing, in the synchronous mode, DFE coefficient updating based on the DFE_IL, <DFE_IFC>, DFE_μ, $E_{i-1}$ and a previously obtained (i−1)st set (<$SD_{i-1}$>) of k number of decision values ($Q_1$ to $Q_k$) to thereby supply an ith set (<$SDC_i$>) having k number of DFE coefficients ($J_1$ to $J_k$) and in the asynchronous mode, performing DFE coefficient updating based on the <$SD_{i-1}$>, DFE_IL, <DFE_IFC>, DFE_μ, $E_{i-1}$ and $H_{i-1}$ to thereby supply an <$SDC_i$>.

3. The apparatus according to claim 2, wherein said adaptive equalization means further includes:
   means for performing FFE on the $IS_i$ based on the previously obtained (i−1)st set ($<SFC_{i-1}>$) having k number of FFE coefficients ($B_1$ to $B_k$) to thereby provide an ith set ($<SIS_i>$) having k number of interpolated sample values ($L_1$ to $L_k$) and first equalized data;
   means for performing DFE on the D based on the previously obtained (i−1)st set ($<SDC_{i-1}>$) having k number of DFE coefficients ($J_1$ to $J_k$) to thereby provide an ith set ($<SD_i>$) having k number of decision values ($Q_1$ to $Q_k$) and second equalized data; and
   means for adding the first equalized data to the second equalized data, thereby providing the $ES_i$.

4. The apparatus according to claim 3, wherein said phase error signal obtaining means includes:
   means for performing phase error detection based on the $D_i$, $D_{i-2}$ and $E_{i-1}$ to thereby provide an ith phase error detection signal; and
   means for performing loop filtering on the ith phase error detection signal to thereby provide the $PE_i$.

5. The apparatus according to claim 4, wherein said sampling clock signal generating means includes:
   means for digital to analog (D/A) converting the $PE_i$ to thereby provide an ith analog voltage level;
   means for performing mode selection based on the W to select the synchronous mode if the W is equal to 1, thereby providing the ith analog voltage level as an ith analog voltage signal and if the W is not equal to 1, to select the asynchronous mode, thereby providing a predetermined constant analog voltage level as an ith analog voltage signal; and
   means for carrying out voltage controlled oscillation (VCO) on the ith analog voltage signal, thereby supplying the $SCS_i$.

6. The apparatus according to claim 4, wherein said interpolation filtering means includes:
   a first adder for adding the $PE_{i-1}$ to the W, thereby providing an ith pre-added signal ($PA_i$);
   a second adder for adding the $PA_i$ to a previously obtained (i−1)st accumulation module value ($ACV_{i-1}$), thereby providing an ith added signal ($A_i$);
   an accumulation module for accumulating said $A_i$ to supply an ith accumulated value ($ACV_i$) if the $ACV_i$ is equal to or less than a predetermined threshold integer value (TH) and if the $ACV_i$ is greater than the TH, substituting $ACV_i$ with ith corrected accumulated module value ($CACV_i$) obtained by subtracting the TH from the $ACV_i$ to thereby supply the $CACV_i$ as the $ACV_i$;
   a first delay circuit to delay the $ACV_i$ by one detection delay interval (DD) to thereby provide a delayed $ACV_i$ to be added at said second adder at a subsequent pre-added signal ($PA_{i+1}$) as a previously obtained $ith$ accumulated value;
   an integer processing circuit to get only the integer value from the $ACV_i$ to thereby supply an ith integer;
   a comparator for comparing the ith integer with a previously obtained (i−1)st integer and generating the $H_i$ if the predetermined hold condition is satisfied, wherein the predetermined hold condition is that the absolute difference between the ith integer and the previously obtained (i−1)st integer is greater than 1;
   a second delay circuit to delay the ith integer by the DD to thereby provide a delayed ith integer to the comparator as a previously obtained ith integer to be compared with an (i+1)st integer thereat;
   a subtractor for subtracting the ith integer from the $ACV_i$ to thereby generating a $\mu k$ representing the difference between the ith integer and the $ACV_i$;
   a look up table processor for selecting a corresponding set of filter coefficients among sets of predetermined filter coefficients by using the $\mu k$ as an address signal to access the sets; and
   a finite response filter for filtering the corresponding set of filter coefficients based on the $S_i$ to thereby provide the $IS_i$.

7. The apparatus according to claim 4, wherein said phase error detection means contains:
   a phase error subtractor for subtracting the $D_{i-2}$ from the $D_i$ to thereby provide a subtracted phase error value; and
   a first multiplier for multiplying the subtracted phase error value by the $E_{i-1}$ to thereby provide an ith phase error detection signal.

8. The apparatus according to claim 7, wherein said loop filtering means contains:
   a second multiplier for multiplying the ith phase error detection signal by $\alpha$, $\alpha$ being a predetermined constant, to thereby supply ith first phase error data;
   a third multiplier for multiplying the ith phase error detection signal by $\beta$, $\beta$ being a predetermined constant to thereby supply an ith second phase error data;
   a third adder for adding the ith second phase error data to previously obtained (i−1)st second phase error data to thereby supply ith third phase error data;
   a phase error delay circuit to delay the ith second phase error data by the DD to thereby provide delayed ith second phase error data as previously obtained ith second phase error data to said third adder; and
   a fourth adder for adding the ith first error data to the ith third phase error data to thereby supply the $PE_i$.

9. The apparatus according to claim 3, wherein FFE performing means contains:
   a tapped delay circuit to delay each of $L_1$ to $L_k$ of the $<SIS_{i-1}>$ by the DD by using the $IS_i$ to thereby provide a delayed $<SIS_i>$ having delayed $L_1$ to $L_k$ as $<SIS_i>$;
   a multiplier circuit for multiplying the delayed $L_1$ to $L_k$ of the delayed $<SIS_i>$ with $B_1$ to $B_k$ of the $<SFC_{i-1}>$, respectively, thereby supplying first respective multiplied values; and
   a first adder for summing up the first respective multiplied values to thereby provide the first equalized data.

10. The apparatus according to claim 9, wherein said FFE coefficient updating means contains:
   a second multiplier circuit for multiplying the $E_{i-1}$ by the FFE_$\mu$ to thereby provide a third multiplied value;
   a third multiplier circuit for multiplying the third multiplied value by the $<SIS_{i-1}>$ to thereby provide a fourth multiplied values set;
   a second adder for adding the 4th multiplied values set to a previously obtained (i−1)st initial filter coefficients set ($<SIFC_{i-1}>$) having initial filter coefficients (IFC), thereby supplying a candidate FFE coefficients set;
   a switch for providing the candidate FFE coefficients set as an ith set ($<SFC_i>$) having IFC if the $H_{i-1}$ is not inputted thereto and providing the $<SIFC_{i-1}>$ as the $<SFC_i>$ if the $H_{i-1}$ is inputted thereto;
   an IFC updating circuit, based on the FFE_IL, $<FFE\_IFC>$ and $<SFC_i>$, for performing IFC updating to thereby supply an ith initial filter coefficients set (<SIFC$_i$>); and a delay circuit to delay the <SIFC$_i$> by the DD to thereby provide a delayed <SIFC$_i$>.

11. The apparatus according to claim 3, wherein DFE performing means contains:

a tapped delay circuit to delay each of Q$_1$ to Q$_k$ of the <SD$_{i-1}$> by the DD by using the D$_i$ to thereby provide a delayed <SD$_i$> having delayed Q$_1$ to Q$_k$ as the <SD$_i$>;

a multiplier circuit for multiplying the delayed Q$_1$ to Q$_k$ of the <SD$_i$> by J$_1$ to J$_k$ of the <SDC$_{i-1}$>, respectively, thereby supplying second respective multiplied values; and an adder for summing up the second respective multiplied values to thereby provide the second equalized data.

12. The apparatus according to claim 3, wherein said MLSD performing means includes:

a branch metric providing circuit to provide first to 4th branch metrics (BM1, BM2, BM3 and BM4) based on the SL and the ES$_i$ by using a predetermined branch metric generation method;

a branch metric comparison circuit to generate a first state control signal (SS1) for a state 1 (S1) of ES$_i$, a second state control signal (SS2) for a state 2 (S2) of ES$_i$, an ith first error metric (EM1$_i$) and an ith second error metric (EM2$_i$) based on the branch metrics BM1 to BM4 and a previously obtained (i-1)st difference evaluation value (DEV$_{i-1}$) by using a predetermined branch metric comparison technique;

an error metric subtractor to subtract EM1$_i$ from EM2$_i$ to thereby provide an ith difference evaluation value (DEV$_i$);

a difference evaluation value (DEV) delaying circuit to delay DEV$_i$ by the DD either based on the DEV$_{i-1}$ and CLR in the synchronous mode or based on the DEV$_{i-1}$, CLR and H$_{i-1}$ in the asynchronous mode to thereby provide a delayed DEV$_i$ as a previously obtained ith DEV (DEV$_i$) to the branch metric comparison circuit; and a survivor path deciding circuit for deciding a survivor path either based on the SS1, SS2 and DEV$_i$ in the synchronous mode or based on the SS1, SS2, DEV$_i$ and H$_{i-1}$ in the asynchronous mode by using a predetermined survivor path deciding method to thereby supply the BD$_i$, D$_i$, D$_{i-1}$ and D$_{i-2}$.

13. The apparatus according to claim 12, wherein said survivor path deciding circuit contains:

a survivor path selection module, by employing a predetermined survivor path selection method, for providing a first final survivor path value for the ES$_i$ based on the SS1 and a second final survivor value for the ES$_i$ based on the SS2 and supplying a first candidate decision value (C1DV) set (<C1DV>) having an ith first candidate decision value (C1D$_i$), an (i-1)st first candidate decision value (C1D$_{i-1}$) and (i-2)nd first candidate decision value (C1D$_{i-2}$) for the ES$_i$ based on the SS1; and at the same time supplying a second candidate decision value (C2DV) set (<C2DV>) having an ith second candidate decision value (C2D$_i$), an (i-1)st second candidate decision value (C2D$_{i-}$) and (i-2)nd second candidate decision value (C2D$_{i-2}$) for the ES$_i$ based on the SS2;

a data bit detector to provide 0 as a coded data bit if the DEV$_i$ is greater than 0 and provide 1 as a coded data bit if the DEV$_i$ is less than 0 based on the DEV$_i$;

a decision value generating circuit for generating the D$_i$, D$_{i-1}$ and D$_{i-2}$ by using the <C1DV> and the <C2DV> either based on the coded data bit in the synchronous mode or based on the coded data bit and the H$_{i-1}$ in the asynchronous mode; and a multiplxer for multiplexing the first final survivor path value and the second final survivor path value based on the coded data bit to thereby supply the BD$_i$ having either 1 or 0, wherein each of the first and the second survivor path values represents a value obtained by using a predetermined viterbi algorithm.

14. The apparatus according to claim 13, wherein said decision value generating circuit generates the C1D$_i$ as the D$_i$ if the C1D$_i$ is less than the C2D$_i$, and if otherwise, the C2D$_i$ as the D$_i$; generates the C1D$_{i-1}$ as the D$_{i-1}$ if the C1D$_{i-1}$ is less than the C2D$_{i-1}$, and if otherwise, the C2D$_{i-1}$ as the D$_{i-1}$; and generates the C1D$_{i-2}$ as the D$_{i-2}$ if the C1D$_{i-2}$ is less than the C2D$_{i-2}$, and if otherwise, the C2D$_{i-2}$ as the D$_{i-2}$.

15. The apparatus according to claim 14, wherein said multiplxer supplies 1 as the BD$_i$ if +2 or -2 is inputted therein and supplies 0 as the BD$_i$ if 0 is inputted therein based on the coded data bit under the condition that the SL is 2.

* * * * *